United States Patent [19]

Edlund et al.

[11] Patent Number: 5,104,131
[45] Date of Patent: Apr. 14, 1992

[54] ARRANGEMENT FOR SEALING A RECIPROCATING ROD

[75] Inventors: Roy Edlund, Echterdingen; Heinz K. Müller, Waiblingen, both of Fed. Rep. of Germany

[73] Assignee: Busak & Luyken GmbH & Co., Stuttgart, Fed. Rep. of Germany

[21] Appl. No.: 742,060

[22] Filed: Aug. 6, 1991

Related U.S. Application Data

[63] Continuation of Ser. No. 397,715, Aug. 23, 1989, abandoned.

[30] Foreign Application Priority Data

Aug. 24, 1988 [DE] Fed. Rep. of Germany ....... 3828692

[51] Int. Cl.$^5$ .............................................. F16J 9/06
[52] U.S. Cl. .................................... 277/144; 277/27; 277/165
[58] Field of Search ................... 277/144, 165, 166, 3, 277/27, 117, 116.8, 103, 138, 143, 168

[56] References Cited

U.S. PATENT DOCUMENTS

| | | | |
|---|---|---|---|
| 2,631,907 | 3/1953 | Johnson, Jr. | 277/144 |
| 3,309,016 | 9/1975 | Traub et al. | 277/165 |
| 3,525,530 | 8/1970 | Bauer et al. | 277/165 |
| 3,630,532 | 12/1971 | Traub | 277/144 |
| 3,942,806 | 3/1976 | Edlund | 277/165 |
| 4,252,331 | 2/1981 | Siegel | 277/165 |
| 4,449,718 | 5/1984 | Müller | 277/165 |
| 4,560,174 | 12/1985 | Bisi | 277/165 |
| 4,709,932 | 12/1987 | Edlund et al. | 277/165 |
| 4,723,782 | 2/1988 | Müller | 277/165 |
| 4,819,952 | 4/1989 | Edlund | 277/165 |
| 4,828,272 | 5/1989 | Pedersen | 277/165 |
| 4,917,390 | 4/1990 | Lee et al. | 277/165 |

FOREIGN PATENT DOCUMENTS

| | | |
|---|---|---|
| 322930 | 4/1972 | Austria . |
| 2705081 | 2/1977 | Fed. Rep. of Germany . |
| 3603669 | 2/1986 | Fed. Rep. of Germany . |
| 3709320 | 3/1987 | Fed. Rep. of Germany . |
| 2115518 | 2/1982 | United Kingdom . |

Primary Examiner—William A. Cuchlinski, Jr.
Assistant Examiner—Daniel G. DePumpo
Attorney, Agent, or Firm—Cohn, Powell & Hind, P.C.

[57] ABSTRACT

In the case of conventional seal arrangements comprising a sealing ring (5) consisting of a tough-elastic plastic material and a rubber-elastic stressing ring (6), where one edge (53) of the sealing ring (5) is in contact with the circumference of a rod (1), the pressing force encountered at the edge is dependent, to a very high degree, on the fluid pressure because the fluid pressure acts upon the circumferential surface of the sealing ring (5) either directly or via the rubber-elastic stressing ring (6). The pressing force, which consequently rises considerably in the presence of high fluid pressure, leads to high frictional forces at the sealing edge (53), which increase even further in the course of operating time. The invention makes the system independent of the operating pressure by the fact that the stressing ring (6) is arranged at the high-pressure end of the sealing ring (5) and that the size of the surface, upon which the fluid pressure acts from the outside, can be exactly determined by the particular configuration of the contact surface for the stressing ring.

12 Claims, 2 Drawing Sheets

ARRANGEMENT FOR SEALING A RECIPROCATING ROD

This is a continuation of copending application Ser. No. 07/397,715 filed on Aug. 23, 1989 now abandoned.

BACKGROUND AND SUMMARY OF THE INVENTION

The present invention relates to an arrangement for sealing a reciprocating rod relative to a housing part surrounding the rod in slightly spaced relationship, in particular for use in shock absorbers, comprising a sealing ring fitted in a groove in the housing part, the sealing ring consisting of a tough-elastic plastic material, having a diameter smaller than that of the groove and carrying on its inside, near its high-pressure end, an edge forming the beginning of a conical surface opening towards the low-pressure end and forming with the circumferential surface of the rod a wedge-shaped gap of a small wedge angle, and comprising further a stressing ring of a rubber-elastic material resting against the base of the groove and being loaded between a flank of the groove and the neighboring end face of the sealing ring, for retaining the sealing ring in contact with the opposite flank of the groove.

Such an arrangement has been known already from DE 27 05 081 A1. In the case of this known seal, the stressing ring is arranged at the low-pressure end so that the fluid to be sealed between the circumferential face of the sealing ring and the base of the groove fills the existing gap. It is ensured in this manner that the force by which the edge of the sealing ring is pressed against the rod is substantially proportional to the pressure of the fluid to be sealed off. The stressing ring is arranged in such a manner that it exerts simultaneously a radially-directed pressing force upon the sealing ring and that the stressing forces are directed upon the sealing edge.

An arrangement in which the stressing ring is located on the high-pressure side is used also in the double-stripper arrangement known from DE 36 03 669 A1.

It has been found that in seal arrangements of this type friction increases in the course of operating time. This is due to the fact that the contact surface formed by the edge gets larger and tends to flatten. In the case of operating pressures varying within broad limits, which is the case in particular with shock absorbers, it may in addition happen that the pressing force, having been adjusted correctly for low operating pressures, rises considerably in the case of high operating pressures, which may also lead to undesirably high friction values.

Now, it is the object of the present invention to provide a seal arrangement where the friction value rises as little as possible as the differential pressure acting upon the sealing arrangement increases, and where the friction value increases also as little as possible in the course of operating time. This object is achieved for an arrangement of the type described at the outset by the fact that the edge forms the starting point also for a conical face opening towards the high-pressure end and that the stressing ring is arranged at the high-pressure end of the sealing ring.

The arrangement of a conical surface opening toward the high-pressure end, though it may be very short, imparts to the edge improved stability so that it shows a reduced tendency to flatten. In addition, the arrangement of the stressing ring at the high-pressure end of the sealing ring prevents the sealing ring from being loaded on its outside, by the fluid to be sealed off, over its full length. Rather, it is now possible, by giving the contact surface an appropriate configuration, to meter exactly the effect of the fluid pressure on the pressing force prevailing at the edge and to make the latter largely independent of the fluid pressure.

The seal arrangement according to the invention permits the most varied solutions regarding the design and arrangement of the stressing ring, as well as regarding the contact face on the sealing ring for the stressing ring. For example, the groove provided in the housing part may have a section of larger diameter at its high-pressure end, and the stressing ring may in part engage the annular recess formed by this section of larger diameter. Such an arrangement may be convenient in particular when the stressing ring is in contact with a plane end face of the sealing ring.

According to a preferred embodiment, however, the arrangement is such that the stressing ring loads the sealing ring radially over a section of its outer surface extending from the high-pressure end of the sealing ring to about that plane which is defined by the edge of the sealing ring being in contact with the rod. As the fluid pressure acting on that section of the inner face of the sealing ring which extends from the sealing edge to the high-pressure end of the sealing ring has the tendency to lift the sealing ring off the rod, this pressure is compensated by the pressure acting on the sealing ring from the outside, via the stressing ring. Depending on whether the outer face being loaded radially by the stressing ring ends before or behind the plane defined by the edge, a state of undercompensation or overcompensation will occur. A slight overcompensation may help ensure that a safe sealing effect is always obtained even if the edge pressure resulting from a certain oversize of the sealing ring should decrease, or even disappear completely in the course of time, while on the other hand the pressing force resulting from the fluid pressure will not rise excessively in the presence of high pressures. However, such compensation can already be achieved solely by the fact that the outer surface of the sealing ring is stepped in such a manner that the sealing ring exhibits a section of reduced diameter extending from the high-pressure end of the sealing ring approximately to the plane defined by the edge of the sealing ring which is in contact with the rod. In this case, it is of no importance for the compensation of the fluid pressure whether or not the stressing ring is in contact with the section of reduced diameter of the sealing ring. If the stressing ring is in contact with the section of reduced diameter of the sealing ring, then it would be particularly preferable to give the stressing ring the design of a square ring. The spacing between the end of the radially loaded section of the outer surface and the plane defined by the edge should not exceed 1 mm.

According to a particularly preferred embodiment of the invention, a radially outer section of the end face of the sealing ring is formed by a conical surface intersecting the circumferential face of the sealing ring in the area of the plane defined by the edge which is in contact with the rod. One obtains in this case an annular space of substantially triangular cross-section in which the correspondingly sized stressing ring, being preferably an O ring, is retained in compressed condition so that it rests against the outer conical surface of the sealing ring by the force resulting from the initial pressure. This force comprises on the one hand an axial component by which the sealing is pressed against the opposite flank of the groove, and on the other hand a radial component leading to a constant edge pressure. It is possible in this manner to achieve a particularly good sealing behavior of the seal, with a very simple structure. Conveniently, the angle formed between the conical face forming part of the end face and the plane defined by the edge should be equal in this case to 20° to 40°.

It is important for the function of the arrangement according to the invention that the sealing ring be given sufficient bending resistance. A body of high bending resistance is obtained when the conical surface on the high-pressure end extends along the inner face of the sealing ring up to the high pressure end of the sealing ring so that it intersects the conical surface which forms part of the end face and which also forms the contact surface for the stressing ring. With respect to this conical surface it is also advantageous if the angle included between this surface and the plane defined by the edge is equal to 20° to 40°.

Furthermore, the conical surface on the low-pressure side, on the inside of the sealing ring, may form with the rod surface an angle of 5° to 15°.

BRIEF DESCRIPTION OF THE DRAWINGS

The invention will now be described and explained in more detail with reference to the embodiments illustrated in the drawing. The features which can be derived from the specification and the drawing may be employed in other embodiments of the invention either individually or in any combination thereof. Each of FIGS. 1 to 5 shows, in cross-section another embodiment of a sealing arrangement designed according to the invention.

DETAILED DESCRIPTION OF THE PREFERRED EMBODIMENT

Figure 1:
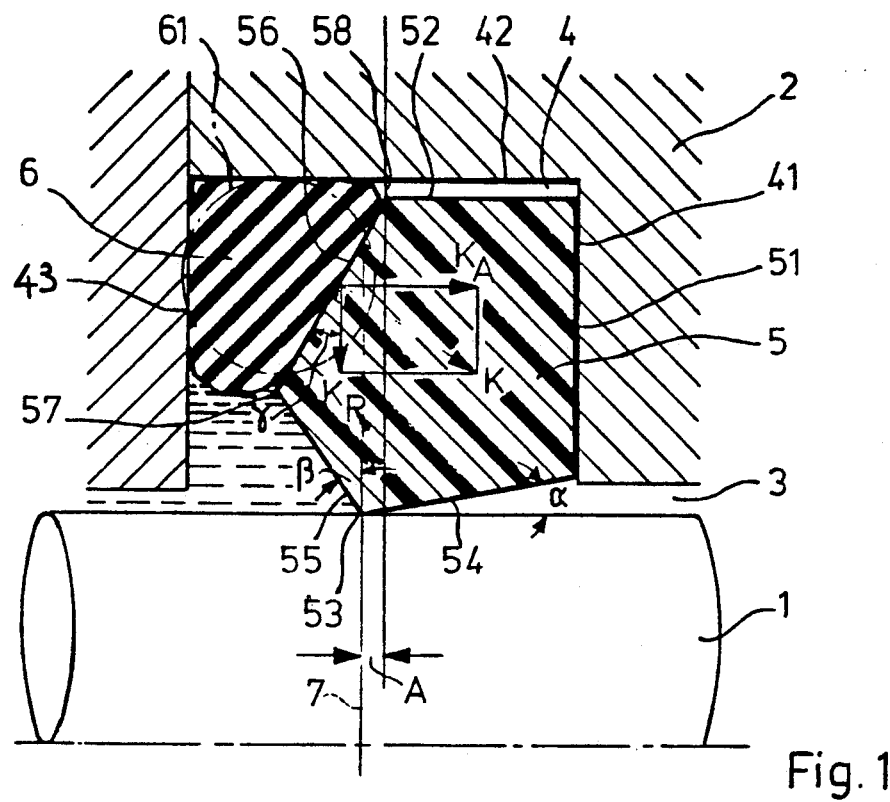

The arrangement illustrated in FIG. 1 serves for sealing a rod 1 relative to a housing 2 comprising a bore 3 which is received by the rod 1. A housing part 2 is provided with an annular groove 4 surrounding the rod 1 and accommodating a sealing ring 5 and a stressing ring 6. The sealing ring 5 exhibits a pentagonal cross-section and a plane end face 51 by which it rests against the neighboring flank 41 of the groove 4. In addition, it comprises a cylindrical outer face 52, arranged at a certain distance from the base of the groove 42, so that the sealing ring 5 is received by the groove 4 with a certain play. The inner face of the sealing ring 5 facing the rod 1 is provided with an edge 53 by which it rests against the circumference of the rod 1, exerting upon the latter a certain pressing force. The edge 53 is formed by the line of intersection between two conical surfaces 54, 55, the conical surface 54, which extends from the edge 53 to the plane end face 51 forming with the surface of the rod 1 a wedge-shaped gap having a wedge angle of $\alpha$ 10°. The second conical surface 55, which extends in opposite direction relative to the first conical surface 54, and the plane 7 defined by the edge 53 include between them an angle $\beta$ of 35°. Finally, the fifth side of the pentagon is formed by an outer conical surface 56 extending from the end of the cylindrical circumferential face 52 and intersecting the inner conical surface 55.

The said outer conical surface 56 extends from its intersection 57 with the inner conical surface 55 to a point 58 located beside the plane 7 defined by the edge 53, spaced by a distance A in the direction of the plane end face 51 of the sealing ring. The outer end face 56 and the plane 7 defined by the edge 53 include between them an angle $\gamma$ of 30°.

The stressing ring 6 is located in the annular space defined by the outer conical surface 56, the base of the groove 42 and the second flank 43 of the groove 42. The annular space exhibits a substantially triangular cross-section. The stressing ring 6 takes the form of an O ring whose dimensions, in the unstressed condition, are indicated by a dash-dotted circle 61 in FIG. 1. Consequently, the stressing ring 6 is deformed in the manner illustrated in FIG. 1, and thus given a prestress which ensures that the stressing ring engages the outer conical surface 56 at a force K determined by the said prestress. Due to the inclination of the conical surface 56, the force K comprises an axial component $K_A$ and a radial component $K_R$. The axial component $K_A$ causes the seal ring 5, regardless of the pressure of the fluid to be sealed off, to be pressed by its plane end face 51 against the neighboring flank 41 of the groove 4. The radial component $K_R$ has the effect of urging the sealing ring 5 by its edge 53 against the circumference of the rod 1, likewise at a pressure independent of the fluid pressure.

The arrangement described above is installed so that the stressing ring 6 faces the fluid to be sealed off, i.e. that the end face 51 at the low-pressure side of the sealing ring 5 engages the flank 41 of the groove 4. The rubber-elastic stressing ring 6, therefore, seals the annular space between the circumferential face 52 of the sealing ring 5 and the base of the groove 42 against the pressure fluid. The rubber-elastic stressing ring 6 transfers of course the fluid pressure to the outer conical surface 56 of the stressing ring 5 so that the fluid pressure increases on the one hand the force by which the sealing ring 5 is urged against the flank 41 of the groove 4, and exerts on the other hand also a radial force on the stressing ring 5. However, this radial force is counteracted by the force which the pressure fluid exerts directly on the inner conical surface 55. If both conical surfaces have the same axial length, i.e. if the outer conical surface 56 ends at the plane defined by the sealing edge 7, then the pressures exerted on the two conical surfaces balance out each other. The pressing force present at the edge 53 would then be independent of the pressure. In the illustrated embodiment, however, the axial length of the outer conical surface 56 is slightly greater so that the pressure of the fluid to be sealed off increases the pressing force present at the edge 53. Given the fact that the distance A between the plane 7 defined by the edge 53 and the point 58 where the outer conical surface 56 ends is only small, this pressure-dependent component of the pressing force is also relatively small and does not, in case of high pressure of the fluid to be sealed off, lead to an excessive increase of the pressing force. In practice, the distance A should not be greater than 1 mm.

As will be understood easily, the pressing force by which the seal is urged against the edge 53 is determined, in the described arrangement, substantially by the initial stress of the stressing ring 6 and can, therefore, be adjusted to a value optimally suited for the respective application by selecting appropriate dimensions for the stressing ring. In addition, the pressing force may be determined by the dimensions of the sealing ring, which may be given a certain oversize so that it engages the circumference of the rod 1 by a certain pressing force resulting from its own initial stress. However, given the fact that the sealing ring consists of a tough-elastic plastic material, for example a reinforced PTFE, there is a risk that the initial stress generated by such an oversize may be reduced in the course of time and even disappear eventually. Furthermore, by convenient selection of the dimensions of the outer conical surface 56, the pressing force can be influenced as a function of the fluid pressure. If the inner and the outer conical surfaces have the same axial length, the influence of the fluid pressure on the pressing force is practically eliminated. If the outer conical surface 56 is given a shorter axial length than the inner conical surface 55, so that the point of intersection 58 with the circumferential surface 52 of the sealing ring comes to lie before the plane 7 defined by the edge 53, then the sealing ring 5 will even be relieved progressively as the fluid pressure rises, which means that the pressing force at the edge 53 will decrease. These variations of the pressing force in response to the pressure should, however, remain small so that the distance A between the point 58 and the plane 7 should not exceed an amount of 1 mm.

Generally, the described seal arrangement provides the particular advantage that due to the particular cross-sectional shape of the sealing ring the latter can be produced very easily and provides high bending resistance so that no disturbance of the sealing behavior will be encountered due to variations of the cross-sectional shape of the sealing ring. In addition, this configuration permits relatively large tolerances for the design of the sealing ring and the O ring for which commercially available O rings may be used.

Figure 2:
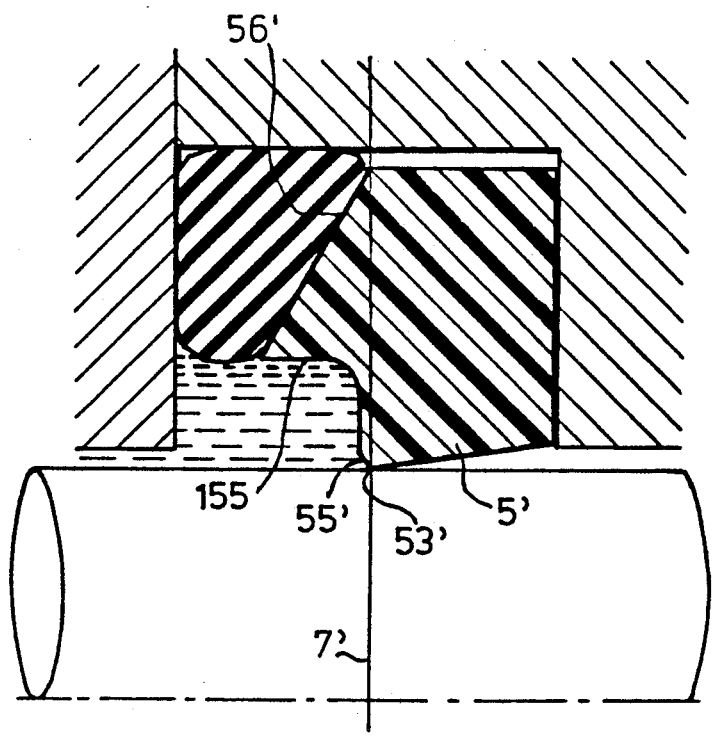

The embodiment according to FIG. 2 differs from that according to FIG. 1 only in that the inner conical surface 55' on the high-pressure side has a small length and that its end is connected with the end of the outer conical surface 56' via a transition surface 155 which defines sort of a step-like recess in the sealing ring 5'. In addition, the outer conical surface 56' ends exactly at the plane 7' defined by the edge 53' so that the forces acting on the sealing ring 5', due to the fluid pressure, balance out each other.

Figure 3:
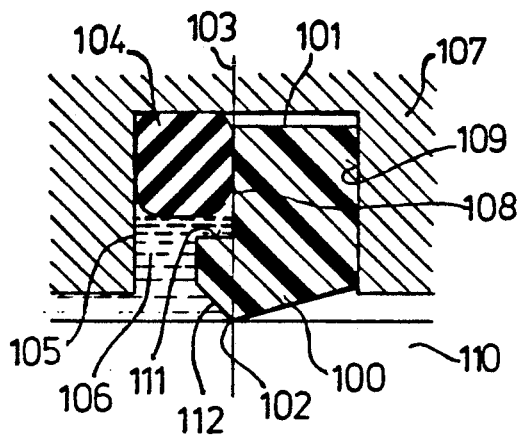

FIG. 3 shows an embodiment where the outer surface 101 of the sealing ring 100 is stepped in such a way that the sealing ring comprises a section of reduced diameter extending from the high-pressure end of the sealing ring to the plane 103 defined by the edge 102. The rubber-elastic stressing ring 104, which is again an O ring, is loaded between the neighboring flank 105 of the groove 106, where the sealing ring 100 and the stressing ring 104 are located in the housing part 107, and the end face 108 at the end of the section of reduced diameter of the sealing ring 100, which coincides with the plane 103. Here again, the stressing ring is given an initial stress which ensures that the end face 109 of the sealing ring on the low-pressure side is pressed firmly upon the adjacent flank of the groove.

The pressing force by which the edge 102 of the sealing ring 100 engages the rod 110, is produced in this case exclusively by the initial stress of the sealing ring, the latter being originally oversized relative to the rod 110. Being supported by the end face 108 extending perpendicularly to the axis of the sealing ring, the stressing ring 104 does not exert any radial force on the sealing ring. Similarly, the sealing ring is not loaded by the pressure fluid in the radial direction because the end face 108, which supports the O ring 104, coincides with the plane 103 defined by the edge 102. It would, however, be absolutely possible to increase or reduce the pressing force encountered at the edge 102 in response to the fluid pressure, by displacing the end face 108 relative to the plane 103, i.e. by arranging the end face 108 either before or behind the plane 103 so that the pressing forces acting on the circumferential surface 111 of the section of reduced diameter and on the conical surface 112 on the high-pressure side would balance out each other.

For the rest, the sealing arrangement according to FIG. 3 has the same design as that described with respect to FIG. 1, and operates also in the same manner.

Figure 4:
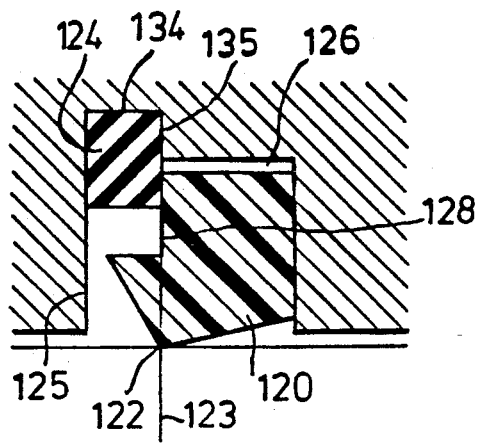

The embodiment according to FIG. 4 differs from that according to FIG. 3 mainly by the fact that the stressing ring 124, which is again in contact with the end face 128 of the sealing ring 120 which comprises a section of reduced diameter, engages in part a recess 134 formed by a section of increased diameter of the groove 126 accommodating the sealing ring 120 and the stressing ring 124. The flank 135 of the recess 134 facing away from the flank 125 of the groove on the high-pressure side lies in the same plane 123 as the end face 128 of the sealing ring 120. This plane coincides again with the plane defined by the edge 122. It will be easily understood that in this case, too, the end face 128 and, accordingly, the flank 135 of the recess 134 might be displaced relative to this plane 123, which is defined by the edge 122, in order to derive part of the pressing force acting at the edge 122 from the fluid pressure.

Figure 5:
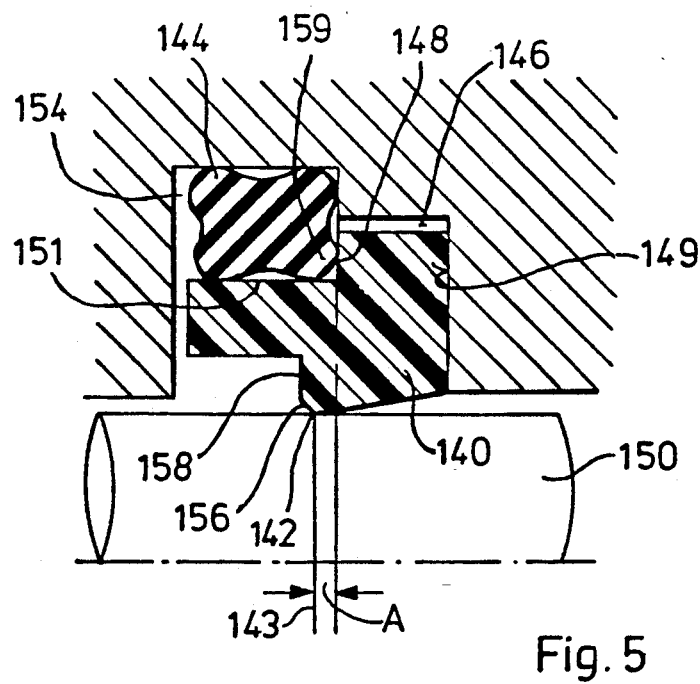

The embodiment illustrated by FIG. 5 is sort of a combination of the embodiments according to FIGS. 2 and 4. In this case, both the outside and the inside of the sealing ring 140 are provided with one step each with end faces 148 and 158, respectively, the latter being arranged at a small distance from the edge 142 by which the sealing ring 140 engages the rod 150. Consequently, the conical face 156 on the high-pressure side has only a relatively short axial length. On the other hand, the length of the outer step of the sealing ring 140 is such that its end face 148, viewed from the high-pressure side, is located on the other side of the plane 143 defined by the edge 142. Consequently, the fluid pressure acting on the circumferential surface 151 of the step is higher than the pressure acting on the inside of the sealing ring 140, up to the edge 142, and the fluid pressure contributes towards increasing the pressing force encountered at the edge 142.

The stressing ring 144 takes in this case the form of a square ring which is again fitted in a recess 154 at the base of the groove 146. The stressing ring 144 is subjected in this case only to radial prestress, whereas no horizontal prestress occurs due to the fact that the width of the recess 154 is larger than the axial extension of the stressing ring 144. Consequently, an axial pressing force is encountered only when fluid pressure acts upon the seal. This embodiment of the invention, therefore, should be used only when the medium pressure encountered in operation is constantly sufficiently high to keep the sealing ring 140 in perfect contact with the flank 149 on the low-pressure side of the groove.

The use of a square ring as stressing ring 144 provides the advantage that the projecting corner 159 of the square ring, which is in contact with both the end face 148 and the circumferential surface 151 of the outer step of the sealing ring 140, ensures perfect transmission of an axial force and also of a radial force upon the edge 142. Accordingly, in the case of this embodiment of the sealing arrangement, the pressing force is composed of three components acting on the edge 142, namely the pressing force produced by the oversize of the stressing ring 140, the pressing force derived from the radial prestress of the sealing ring 144, and a pressing force depending on the fluid pressure, which is a function of the distance A between the end face 148 loaded by the stressing ring 144 and the plane 143 defined by the edge 142. Among these components, the force produced by the oversize may be reduced or even disappear completely in the course of operating time, while the force produced by the stressing ring 144 may be regarded as remaining substantially constant.

From the above description of different embodiments of the invention it appears that the invention can be implemented in the most different ways. Consequently, the features described with reference to the individual embodiments may be used in the most diverse combinations without deviating from the basic structure of the sealing arrangement defined by the patent claims.

The reference numerals in the claims are no restriction but only meant to facilitate understanding.

We claim:

1. Arrangement for sealing a reciprocating rod relative to a housing part surrounding the rod in slightly spaced relationship, in particular for use in shock absorbers, comprising a sealing ring fitted in a groove in the housing part, the sealing ring consisting of a tough-elastic plastic material, having a diameter smaller than that of the groove and carrying on its inside, near its high-pressure end an edge forming the beginning of a conical surface opening towards the low-pressure end and forming with the circumferential surface of the rod a wedge-shaped gap of a small wedge angle, and comprising further a stressing ring of a rubber-elastic material resting against the base of the groove on the high-pressure side of the sealing ring and being loaded between a flank of the groove and a neighboring end face of the sealing ring, so that the stressing ring urges the sealing ring into contact with the opposite flank of the groove, wherein the edge (53, 142) forms the starting point also for a conical face (55, 156) opening toward the high-pressure end so that said edge is formed by two conical surfaces and the stressing ring (6, 144) is arranged at the high-pressure end of the sealing ring (5, 140) to urge the sealing ring against the low pressure flank of the groove, and wherein a radial load of the sealing ring (5, 140) is effected by the stressing ring (6, 144) over a section of the outer surface (56, 151) of the sealing ring (5, 140) extending from the high-pressure end of the sealing ring to about that plane (7, 143) which is defined by the edge (53, 142) of the sealing ring (5, 140) being in contact with the rod (1, 150).

2. Arrangement according to claim 1, wherein the groove said (146) provided in the housing part may have a section of larger diameter at its high-pressure end, and the stressing ring (144) engages in part the annular recess (154) formed by the section of larger diameter.

3. Arrangement according to claim 2, wherein the stressing ring (144) is in contact with the section (151) of reduced diameter of the sealing ring (140) and the stressing ring (144) has a square cross section.

4. Arrangement according to claim 1, wherein the outer surface of the sealing ring (140) is stepped in such a manner that the sealing ring exhibits a section (151) of reduced diameter extending from the high-pressure end of the sealing ring approximately to the plane (143) defined by the edge (142) of the sealing ring (140) which is in contact with the rod (150).

5. Arrangement according to claim 1, wherein the outer surface of the sealing ring (140) is stepped in such a manner that the sealing ring exhibits a section (151) of reduced diameter extending from the high-pressure end of the sealing ring approximately to the plane (143) defined by the edge (142) of the sealing ring (140) which is in contact with the rod (150), and the stressing ring (144) is in contact with the section (151) of reduced diameter of the sealing ring (140).

6. Arrangement according to claim 1, wherein a radially outer section of the end face of the sealing ring (5) is formed by a conical surface (56) intersecting the circumferential face (52) of the sealing ring (5) in the area of the plane (7) defined by the edge (53) which is in contact with the rod (1).

7. Arrangement according to claim 6, wherein the conical surface (56) forming part of the end face and the plane (7) defined by the edge (53) include between them an angle ($\gamma$) of 20° to 40°.

8. Arrangement according to claim 6, wherein the conical face (55) on the inner side of the sealing ring (5) intersects the conical face (56) forming part of the end face and includes between itself and the plane (7) defined by the edge (53) likewise an angle ($\beta$) of 20° to 40°.

9. Arrangement according to 6, wherein the stressing ring (6) is an O ring.

10. Arrangement according to claim 1, wherein the section (56, 151) of the sealing ring (5, 140), which is loaded radially by the stressing ring (6, 144) ends at a point which if spaced from the plane (7, 143) defined by the edge (53, 142) by not more than 1 mm.

11. Arrangement according to claim 1, wherein the conical surface (54) on the low-pressure side, on the inside of the sealing ring (5), forms with the surface of the rod (1) an angle ($\alpha$) of 5° to 15°.

12. Arrangement for sealing a reciprocating rod relative to a housing part surrounding the rod in slightly spaced relationship, in particular for use in shock absorbers, comprising a sealing ring fitted in a groove in the housing part, the sealing ring consisting of a tough-elastic plastic material, having a diameter smaller than that of the groove and carrying on its inside, near its high-pressure end an edge forming the beginning of a conical surface opening towards the low-pressure end and forming with the circumferential surface of the rod a wedge-shaped gap of a small wedge angle, and comprising further a stressing ring of a rubber-elastic material resting against the base of the groove on the high-pressure side of the sealing ring and being loaded between a flank of the groove and a neighboring end face of the sealing ring, so that the stressing ring urges the sealing ring into contact with the opposite flank of the groove, wherein the edge (53, 142) forms the starting point also for a conical face (55, 156) opening toward the high-pressure end so that said edge is formed by two conical surfaces and the stressing ring (6, 144) is arranged at the high-pressure end of the sealing ring (5, 140) to urge the sealing ring against the low pressure flank of the groove, and wherein the outer surface of the sealing ring (140) is stepped in such a manner that the sealing ring exhibits a section (151) of reduced diameter extending from the high-pressure end of the sealing ring approximately to the plane (143) defined by the edge (142) of the sealing ring (140) which is in contact with the rod (150).

* * * * *